(12) United States Patent
Ichikawa et al.

(10) Patent No.: US 10,800,317 B2
(45) Date of Patent: Oct. 13, 2020

(54) VEHICLE LAMP (71) Applicant: Koito Manufacturing Co., Ltd., Tokyo (JP)

(72) Inventors: Tomoyuki Ichikawa, Shizuoka (JP); Takuya Serita, Shizuoka (JP); Masato Harazaki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/747,656

(22) Filed: Jan. 21, 2020

(65) Prior Publication Data

US 2020/0238890 A1 Jul. 30, 2020

(30) Foreign Application Priority Data

Jan. 24, 2019 (JP) ................................ 2019-010584

(51) Int. Cl.
*B60Q 1/14* (2006.01)
*B60Q 1/00* (2006.01)
*H05B 45/32* (2020.01)
*H05B 45/345* (2020.01)
*B60Q 1/02* (2006.01)

(52) U.S. Cl.
CPC ........... *B60Q 1/0088* (2013.01); *H05B 45/32* (2020.01); *H05B 45/345* (2020.01); *B60Q 1/0076* (2013.01); *B60Q 1/02* (2013.01)

(58) Field of Classification Search
CPC ............................... B60Q 1/0076; B60Q 1/02

USPC ......................................................... 315/77
See application file for complete search history.

(56) References Cited

U.S. PATENT DOCUMENTS 5,212,428 A * 5/1993 Sasaki ................ H05B 41/2882
315/224
2012/0319582 A1* 12/2012 Shan ...................... H05B 45/50
315/77
2016/0262232 A1* 9/2016 Fukui ..................... H05B 45/00

FOREIGN PATENT DOCUMENTS

JP 2006-221886 A 8/2006

* cited by examiner

*Primary Examiner* — Thuy Vinh Tran
(74) *Attorney, Agent, or Firm* — Abelman, Frayne & Schwab

(57) ABSTRACT

A vehicle lamp includes: a first light source; a second light source; a first input terminal that receives a first turn-on instruction signal of the first light source; a second input terminal that receives a pulsed second turn-on instruction signal of the second light source; and a turn-on circuit that drives the first light source and the second light source based on the first turn-on instruction signal and the second turn-on instruction signal. The turn-on circuit includes: a drive circuit that becomes active based on the first turn-on instruction signal and the second turn-on instruction signal, and outputs a constant drive current from an output terminal; and a distribution circuit that forms a current path such that the drive current flows to the second light source, and forms a current path such that the drive current flows to the first light source.

10 Claims, 10 Drawing Sheets

FIG. 1

PRIOR ART

VEHICLE LAMP

CROSS-REFERENCE TO RELATED APPLICATIONS

This application is based on and claims priority from Japanese Patent Application No. 2019-010584, filed on Jan. 24, 2019, with the Japan Patent Office, the disclosure of which is incorporated herein in its entirety by reference.

TECHNICAL FIELD

The present disclosure relates to a vehicle lamp used in an automobile or the like.

BACKGROUND

An automobile includes a plurality of lamps having different functions from each other. Examples of such lamps include a high beam or a low beam, a clearance lamp (position lamp) or a daytime running lamp (DRL), and a turn signal lamp. Among these lamps, since the clearance lamp and the turn signal lamp are closely positioned, they are often located in a same case body.

Figure 1:
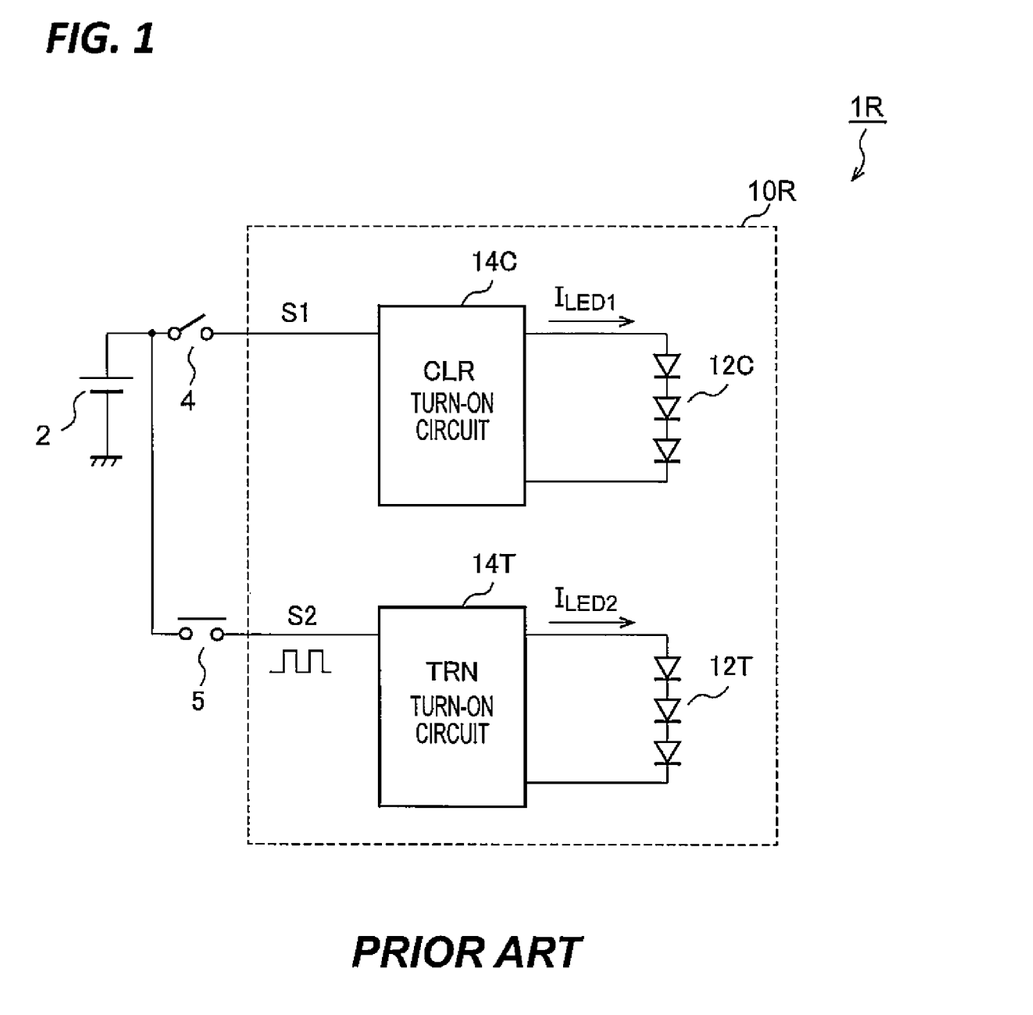
FIG. 1 is a block diagram of a lamp system including a vehicle lamp of the related art.

FIG. 1 is a block diagram of a lamp system 1R including a vehicle lamp 10R of the related art. In FIG. 1, a block related to a clearance lamp and a turn signal lamp is illustrated. The vehicle lamp 10R receives a clearance lamp turn-on instruction signal S1 and a turn signal lamp turn-on instruction signal S2, and according to the signals, turns on a light source 12C for the clearance lamp and a light source 12T for the turn signal lamp. The light source 12C includes a plurality of white light emitting elements (e.g., LEDs) provided in series (or in parallel). The light source 12T includes a plurality of amber light emitting elements provided in series (or in parallel).

The vehicle lamp 10R includes a turn-on circuit 14C for the clearance lamp, and a turn-on circuit 14T for the turn signal lamp. When the turn-on instruction signal S1 is in an on-level, the turn-on circuit 14C supplies a drive current $I_{LED1}$ to the light source 12C to turn on.

The turn-on instruction signal S2 is a pulse signal having a period of about 0.7 second, and a duty ratio of 50%. While the turn-on instruction signal S2 is in a high-level, the turn-on circuit 14T supplies a drive current $I_{LED2}$ to the light source 12T, and causes the light source 12T to blink. See Japanese Patent Laid-Open Publication No. 2006-221886.

SUMMARY

In the vehicle lamp 10R of the related art, the clearance lamp and the turn signal lamp are formed as independent circuits, and there is a problem that the cost is high and the size is large.

The present disclosure has been made in consideration of such problems, and one aspect thereof is to provide a vehicle lamp in which a clearance lamp and a turn signal lamp are integrated.

One aspect of the present disclosure relates to a vehicle lamp. the vehicle lamp includes: a first light source; a second light source; a first input terminal that receives a first turn-on instruction signal instructing turn-on/off of the first light source; a second input terminal that receives a pulsed second turn-on instruction signal instructing turn-on/off of the second light source; and a turn-on circuit that drives the first light source and the second light source based on the first turn-on instruction signal and the second turn-on instruction signal. The turn-on circuit includes a drive circuit that is enabled based on the first turn-on instruction signal and the second turn-on instruction signal, and outputs a constant drive current from an output terminal, and a distribution circuit that forms a current path such that the drive current flows to the second light source in an input state of the second turn-on instruction signal, and forms a current path such that the drive current flows to the first light source in a non-input state of the second turn-on instruction signal.

Another aspect of the present disclosure also relates to a vehicle lamp. The vehicle lamp includes: a first light source; a second light source; a first input terminal that receives a first turn-on instruction signal instructing turn-on/off of the first light source; a second input terminal that receives a pulsed second turn-on instruction signal instructing turn-on/off of the second light source; and a turn-on circuit that drives the first light source and the second light source based on the first turn-on instruction signal and the second turn-on instruction signal. The turn-on circuit (i) immediately turns on the second light source and immediately turns off the first light source when the second turn-on instruction signal transits to the on-level while the first turn-on instruction signal is in the on-level, and (n) immediately turns off the second light source and turns on the first light source after a predetermined time when the second turn-on instruction signal transits to an off-level while the first turn-on instruction signal is in the on-level.

Any combination of the above-described constituent elements, and those obtained by mutually substituting components or expressions of the present disclosure among methods, apparatuses, and systems are also effective as aspects of the present disclosure.

According to one aspect of the present disclosure, a vehicle lamp having a first light source and a second light source may be reduced in cost, or in size.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Summary of Embodiment

In an embodiment disclosed in the present specification, the vehicle lamp includes: a first light source; a second light source; a first input terminal that receives a first turn-on instruction signal instructing turn-on/off of the first light source; a second input terminal that receives a pulsed second turn-on instruction signal instructing turn-on/off of the second light source; and a turn-on circuit that drives the first light source and the second light source based on the first turn-on instruction signal and the second turn-on instruction signal. The turn-on circuit includes a drive circuit that is enabled based on the first turn-on instruction signal and the second turn-on instruction signal, and outputs a constant drive current from an output terminal, and a distribution circuit that forms a current path such that the drive flow to the second light source in an input state of the second turn-on instruction signal, and forms a current path such that the drive current flows to the first light source in a non-input state of the second turn-on instruction signal.

According to the vehicle lamp, the drive circuit may be shared by the first light source and the second light source, and thus, the vehicle lamp may be reduced in cost, or in size. Further, when the second light source is caused to blink, the first light source may be turned off.

One end of the first light source and one end of the second light source may be connected to the output of the drive circuit. The drive circuit may be enabled when at least one of the first turn-on instruction signal and the second turn-on instruction signal is in the on-level. The distribution circuit may include a first switch connected to the other end of the first light source and a second switch connected to the other end of the second light source, and a control circuit that turns on the first switch and turns off the second switch in the non-input state of the second turn-on instruction signal, and turns off the first switch and switches the second switch according to the second turn-on instruction signal in the input state of the second turn-on instruction signal.

The control circuit may include a pulse detection circuit that generates a pulse detection signal that is asserted in the input state of the second turn-on instruction signal, negated in the non-input state of the second turn-on instruction signal. The first switch may be controlled according to the pulse detection signal, and the second switch may be controlled according to the pulse detection signal and the second turn-on instruction signal.

The first light source and the second light source may be connected in series. The drive circuit may be enabled (□) when the first turn-on instruction signal is in the on-level and the second turn-on instruction signal is not input, and (□) when the second turn-on instruction signal is in the on-level. The distribution circuit may include a third switch connected to the first light source in parallel and a fourth switch connected to the second light source in parallel, and a control circuit that turns off the third switch and turns on the fourth switch in the non-input state of the second turn-on instruction signal, and turns on the third switch and turns off the fourth switch in the input state of the second turn-on instruction signal.

The control circuit may include a pulse detection circuit that generates a pulse detection signal that is asserted in the input state of the second turn-on instruction signal, negated in the non-input state of the second turn-on instruction signal. The third switch and the fourth switch may be exclusively turned on according to the pulse detection signal.

Another aspect of the present disclosure is also a vehicle lamp. The vehicle lamp includes: a first light source; a second light source; a first input terminal that receives a first turn-on instruction signal instructing turn-on/off of the first light source; a second input terminal that receives a pulsed second turn-on instruction signal instructing turn-on/off of the second light source; and a turn-on circuit that drives the first light source and the second light source based on the first turn-on instruction signal and the second turn-on instruction signal. The turn-on circuit (□) immediately turns on the second light source and immediately turns off the first light source when the second turn-on instruction signal transits to the on-level while the first turn-on instruction signal is in the on-level, and (□) immediately turns off the second light source and turns on the first light source after a predetermined time when the second turn-on instruction signal transits to an off-level while the first turn-on instruction signal is in the on-level.

Embodiment

Hereinafter, preferred exemplary embodiments of the present disclosure will be described based on the drawings. Identical or corresponding components, members, and processes in each of the drawings will be denoted by the same symbols, and overlapping descriptions thereof will be appropriately omitted. Further, the embodiments are not intended to limit the present disclosure thereto, but are merely exemplary. All features described in the embodiments or combinations thereof may not be essential for the present disclosure.

In the present specification, "a state where a member A is connected to a member B" includes not only a case where the member A and the member B are physically directly connected, but also a case where the member A and the member B are indirectly connected via other members that do not substantially affect such electrically connected state, or do not impair functions and effects exerted by such coupling.

Similarly, a state where a member C is provided between the member A and the member B" includes not only a case where the member A and the member C, or the member B and the member C are directly connected, but also a case where the member A and the member C, or the member B and the member C are indirectly connected via other members that do not substantially affect such electrically connected state, or do not impair functions and effects exerted by such coupling.

Further, in the present specification, symbols assigned to electrical signals such as voltage signals and current signals, or circuit elements such as resistors and capacitors are considered to represent respective voltage values, current values, or resistance values and capacitance values as necessary.

Embodiment

Figure 2:
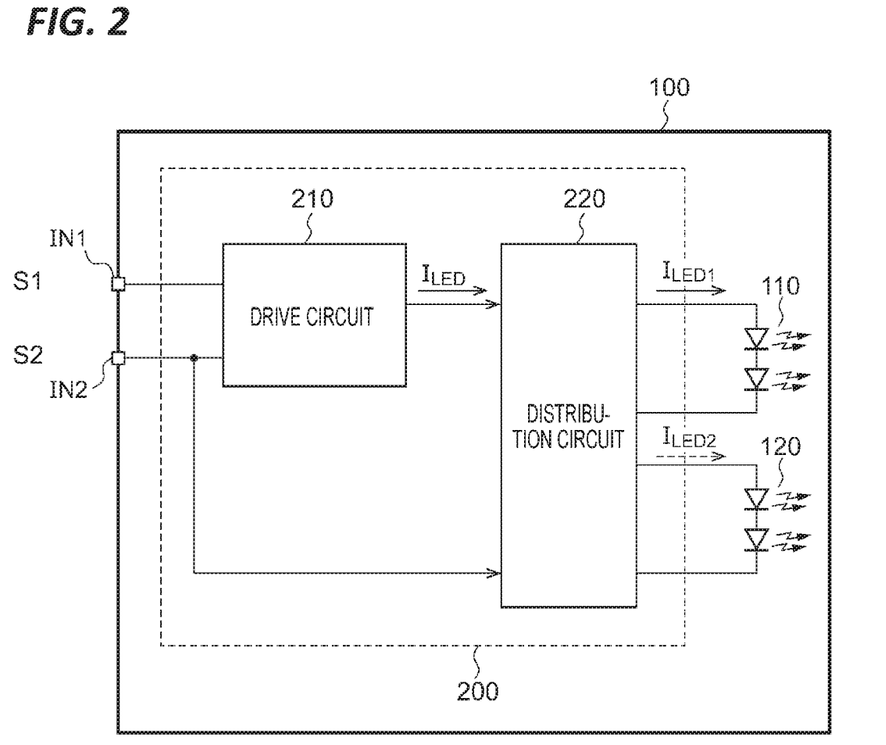
FIG. 2 is a block diagram of a vehicle lamp according to an embodiment.

FIG. 2 is a block diagram of a vehicle lamp 100 according to an embodiment. The vehicle lamp 100 includes a first light source 100, a second light source 120, and a turn-on circuit 200. One proper aspect of the vehicle lamp 100 is an LED socket in which the first light source 110, the second light source 120, and the turn-on circuit 200 are accommodated in one package, and has a shape that is attachable to and detachable from a lamp body (not illustrated). Since the LED socket is a consumable, there is a strong demand for the long life and low costs.

The first light source 110 is a first light source that is required to be turned on in a non-blinked manner according to a turn-on instruction. In the embodiment, the first light source 110 is a clearance lamp, and includes one or a plurality of white semiconductor light sources connected in series. An LED is particularly suitable for the semiconductor light source, but an LD or an organic EL element may be used. The second light source 120 is a light source that is required to be turned on in a blinked manner according to a turn-on instruction. In the embodiment, the second light source 120 is a turn signal lamp, and includes one or a plurality of amber semiconductor light sources connected in series.

A first turn-on instruction signal S1 that instructs turn-on/off of the first light source 110 is input to a first input terminal IN1. The first turn-on instruction signal S1 is a binary signal that takes either an on-level (e.g., high) or an off-level (e.g., low). The on-level and the off-level of the first turn-on instruction signal S1 instruct the first light source 110 to be turned on and to be turned off.

A second turn-on instruction signal S2 that instructs turn-on/off of the second light source 120 is input to a second input terminal IN2. The second turn-on instruction signal S2 is a pulse signal having a predetermined period and a predetermined duty ratio in an active state (input state or enabled state), and alternately repeats the on-level and the off-level. Therefore, when the pulsed second turn-on instruction signal S2 is in the active state, the second light source 120 blinks according to the second turn-on instruction signal S2. When the second turn-on instruction signal S2 is an inactive state (non-input state or disabled state) in which the off-level is maintained, the second light source 120 is turned off.

The first turn-on instruction signal S1 and the second turn-on instruction signal S2 may also serve as a power source for the vehicle lamp 100, and in this case, respective on-levels of the first turn-on instruction signal S1 and the second turn-on instruction signal S2 may be a battery voltage $V_{BAT}$.

The turn-on circuit 200 drives the first light source 110 and the second light source 120 based on the first turn-on instruction signal S1 and the second turn-on instruction signal S2. The turn-on circuit 200 includes a drive circuit 210 and a distribution circuit 220.

The drive circuit 210 becomes the enabled state based on the first turn-on instruction signal S1 and the second turn-on instruction signal S2, and outputs a constant drive current $I_{LED}$ from an output terminal OUT. The drive circuit 210 includes a constant current output driver. The configuration of the drive circuit 210 is not particularly limited, and may be a constant current output linear regulator, a constant current output switching converter (DC/DC converter), or a combination of constant voltage output switching converter and a constant current circuit. Further, the drive current ILED may be a steady current, or may be PWM modulated.

The distribution circuit 220 receives the drive current $I_{LED}$ generated by the drive circuit 210, and (□) forms a current path such that the drive current $I_{LED}$ flows to the second light source 120 in the input state of the second turn-on instruction signal S2, and (□) forms a current path such that the drive current $I_{LED}$ flows to the first light source 110 in the non-input state of the second turn-on instruction signal S2.

Hereinafter, as necessary, the drive current supplied to the first light source 110 is referred to as "$I_{LED1}$," and the drive current supplied to the second light source 120 is referred to as "$I_{LED2}$."

Figure 3:
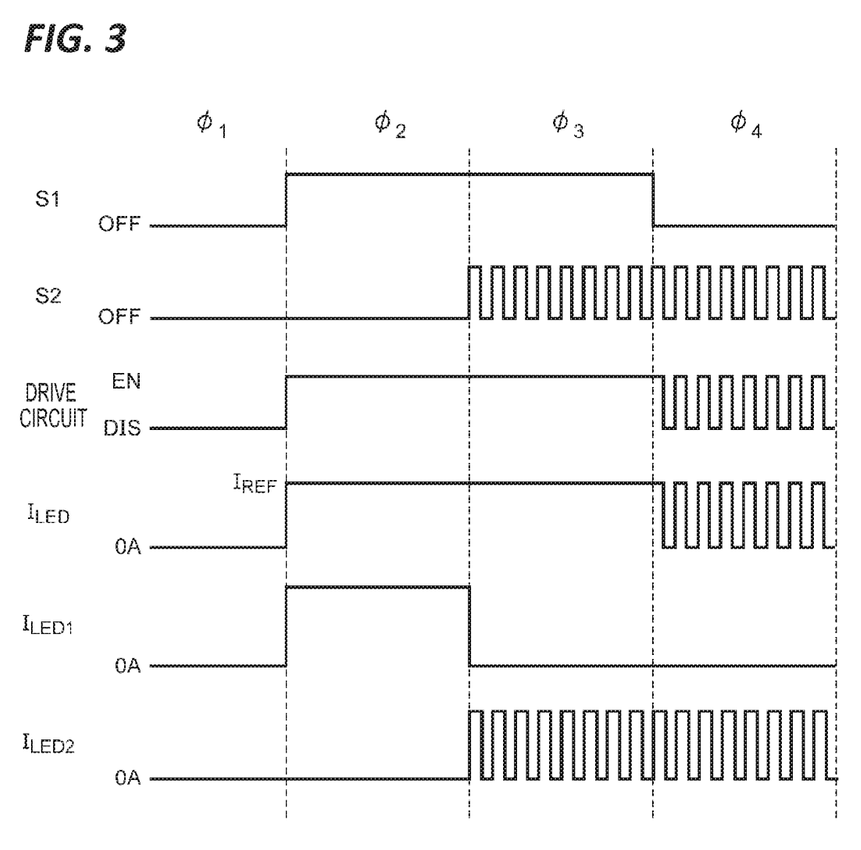
FIG. 3 is a view for explaining an exemplary operation of the vehicle lamp.

The above is the configuration of the vehicle lamp 100. Subsequently, an operation thereof will be described. The following four states may be taken by the combinations of the first turn-on instruction signal S1 and the second turn-on instruction signal S2. FIG. 3 is a view for explaining an exemplary operation of the vehicle lamp 100.

(□) A state where the first turn-on instruction signal S1 is in the off-level and the second turn-on instruction signal S2 is not input In this state φ1. the drive circuit 210 is in a disabled state, and the drive current $I_{LED}$ is not generated. Therefore, the drive currents $I_{LED1}$ and $I_{LED2}$ are not supplied neither of the first light source 110 and the second light source 120, and the first light source 110 and the second light source 120 are turned off.

(□) A state where the first turn-on instruction signal S1 is in the on-level and the second turn-on instruction signal S2 is not input In this state φ2, the drive circuit 210 is in the enabled state, and the drive current $I_{LED}$ that is stabilized at a target level $I_{REF}$ is generated. Since the second turn-on instruction signal S2 is not input, the drive current $I_{LED1}$ is supplied to the first light source 110, and only the first light source 110 is turned on.

(□) A state where the first turn-on instruction signal S1 is in the on-level and the second turn-on instruction signal S2 is input In this state φ3, the drive circuit 210 is in the enabled state, and the drive current $I_{LED}$ that is stabilized at the target level $I_{REF}$ is generated. Since the second turn-on instruction signal S2 is in the input state, the intermittent drive current $I_{LED2}$ is supplied to the second light source 120, and the second light source 120 blinks. The first light source 110 is turned off.

(□) A state where the first turn-on instruction signal S1 is in the off-level and the second turn-on instruction signal S2 is input In this state φ4, the drive circuit 210 is intermittently in the enabled state according to the second turn-on instruction signal S2, and the intermittent drive current $I_{LED}$ that is stabilized at the target level $I_{REF}$ is generated. Since the second turn-on instruction signal S2 is in the input state, the intermittent drive current $I_{LED2}$ is supplied to the second light source 120, and the second light source 120 blinks. The first light source 110 is turned off.

The above is the operation of the vehicle lamp 100.

According to the vehicle lamp 100, the first light source 110 and the second light source 120 may be driven by the common drive circuit 210, and thus, the vehicle lamp 100 may be reduced in the cost, or in the size. Further, when the second light source 120 is blinked, the first light source 110 may be turned off even when the first turn-on instruction signal S1 is in the on-level, and the visibility of the turn lamp is secured.

The present disclosure is understood by the block diagram or the circuit diagram in FIG. 2, or extends to various apparatuses and methods derived from the above description, and thus, is not limited to a specific configuration. Hereinafter, more specific configuration examples or embodiments will be described in order not to narrow the scope of the present disclosure, but to help understanding and clarify the essence or the operation of the present disclosure.

Embodiment 1

Figure 4:
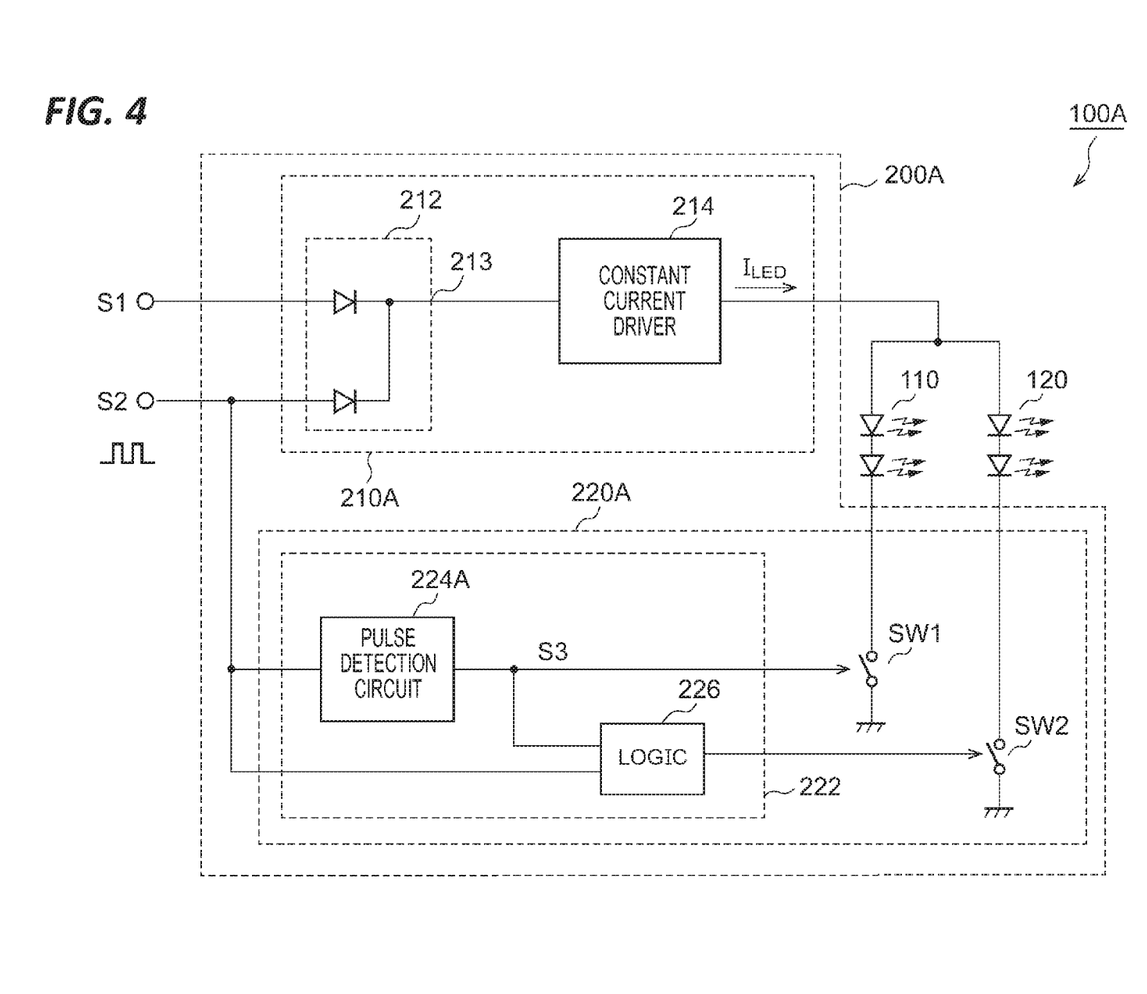
FIG. 4 is a circuit diagram of a vehicle lamp according to an embodiment 1.

FIG. 4 is a circuit diagram of a vehicle lamp 100A according to an embodiment 1. In the embodiment 1, the first light source 110 and the second light source 120 are provided in two parallel paths. One end (anode) of the first light source 110 and one end (anode) of the second light source 120 are connected to an output of a drive circuit 210A.

The drive circuit 210A becomes active (enabled) when at least one of the first turn-on instruction signal S1 and the second turn-on instruction signal S2 is in the on-level. The drive circuit 210A includes a diode OR circuit 212 and a constant current driver 214. The diode OR circuit 212 includes two diodes whose cathodes are commonly connected, and the first turn-on instruction signal S and the second turn-on instruction signal S2 are input to the anodes thereof. An output node 213 of the diode OR circuit 212 is connected to the input terminal (power supply terminal or enable terminal) of the constant current driver 214. The constant current driver 214 is in the enabled state when at least one of the first turn-on instruction signal S1 and the second turn-on instruction signal S2 is in the high-level (e.g., battery voltage $V_{BAT}$).

A distribution circuit 220A includes a first switch SW1, a second switch SW2, and a control circuit 222. The first switch SW1 is connected to the other end (cathode) of the first light source 110. The second switch SW2 is connected to the other end (cathode) of the second light source 120. By turning on (conducting) the first switch SW1, the drive current $I_{LED}$ is supplied to the first light source 110, and by turning on (conducting) the second switch SW2, the drive current $I_{LED}$ is supplied to the second light source 120.

The control circuit 222 turns on the first switch SW1 and turns off the second switch SW2 in the non-output state of the second turn-on instruction signal S2, and turns off the first switch SW1 and switching the second switch SW2 according to the second turn-on instruction signal S2 in the input state of the second turn-on instruction signal S2.

The control circuit 222 includes a pulse detection circuit 224A and a logic circuit 226. The pulse detection circuit 224A generates a pulse detection signal S3 that is asserted in the input state of the second turn-on instruction signal S2 and is negated in the non-input state.

The distribution circuit 220A controls the first switch SW1 according to the pulse detection signal S3, and controls the second switch SW2 according to the pulse detection signal S3 and the second turn-on instruction signal S2. The logic circuit 226 may turn on the second switch SW2 when the pulse detection signal S3 is asserted and the second turn-on instruction signal S2 is in the on-level. Alternatively, the logic circuit 226 may control the second switch SW2 based on only the second turn-on instruction signal S2.

Figure 5:
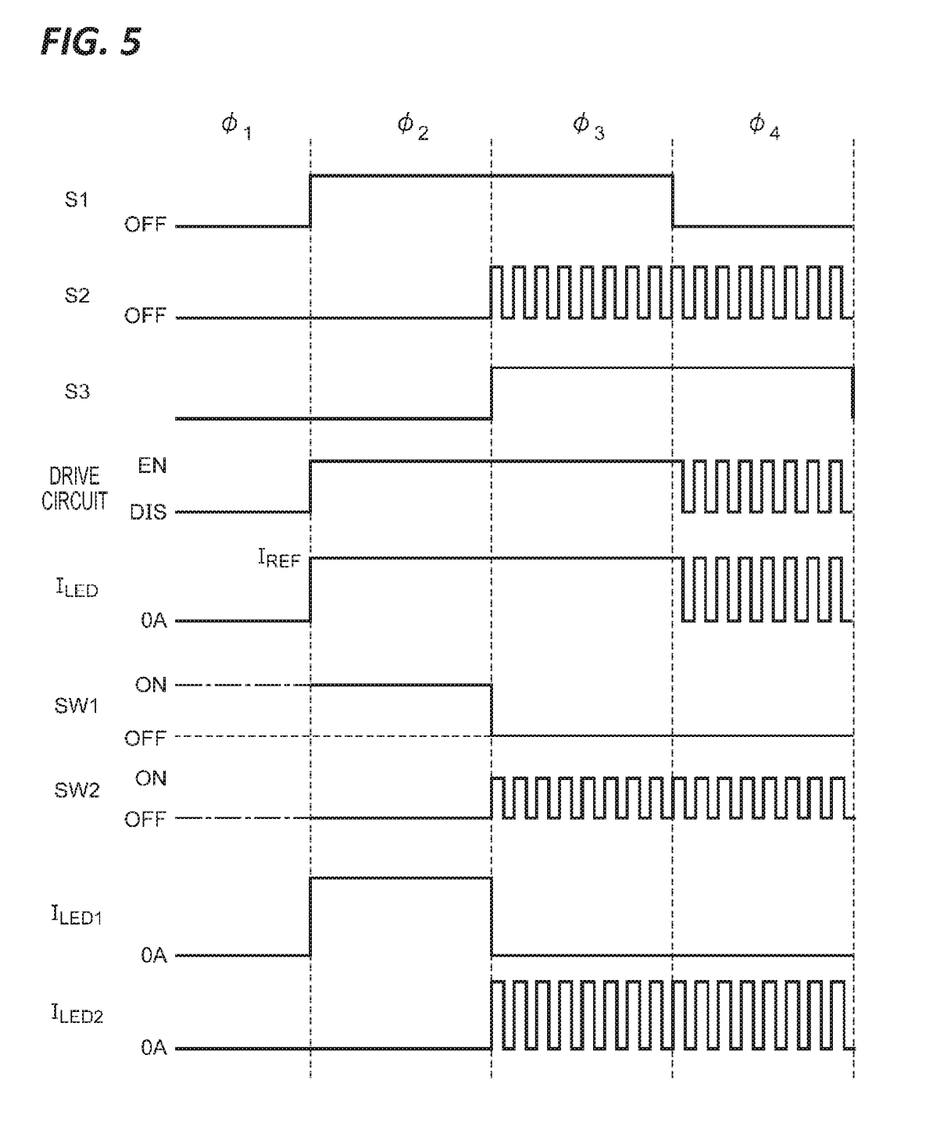
FIG. 5 is an operation waveform diagram of the vehicle lamp in FIG. 4.

FIG. 5 is an operation waveform diagram of the vehicle lamp 100A in FIG. 4. In the non-input states φ1 and φ2 of the second turn-on instruction signal S2, the pulse detection signal S3 is negated (here, low), and in the input states φ3 and φ4 of the second turn-on instruction signal S2, the pulse detection signal S3 is asserted (here, high).

In the state φ2, the first switch SW1 is turned on, and the second switch SW2 is turned off, and the drive current $I_{LED}$ generated by the drive circuit 210A is supplied to the first light source 110, and thus, the first light source 110 is turned on.

In the states φ3, φ4, the first switch SW1 is turned off, and the second switch SW2 is switched according to the second turn-on instruction signal S2. Therefore, the drive current $I_{LED}$ generated by the drive circuit 210A is chopped, and supplied to the second light source 120, and thus, the second light source 120 blinks.

Figure 6:
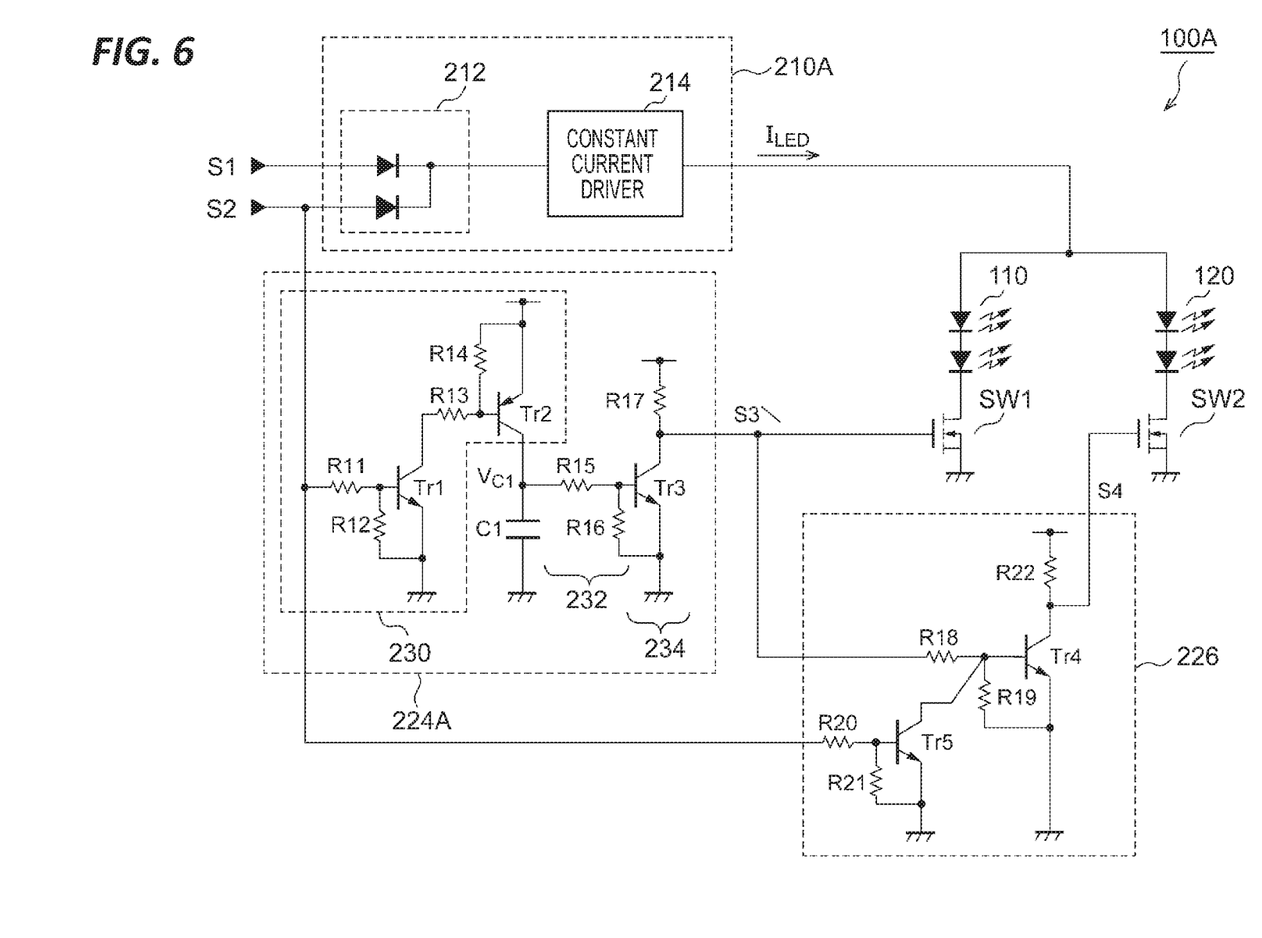
FIG. 6 is a circuit diagram illustrating a more specific exemplary configuration of the vehicle lamp in FIG. 4.

FIG. 6 is a circuit diagram illustrating a more specific exemplary configuration of the vehicle lamp 100A in FIG. 4. The first switch SW1 and the second switch SW2 are N-channel metal oxide semiconductor field effect transistors (MOSFET).

The pulse detection circuit 224A includes a capacitor C1, a charging circuit 230 that charges the capacitor C1 when the second turn-on instruction signal S2 is in the on-level, a discharging path 232 that discharges the capacitor C1 with a predetermined time constant, and an inverter 234. The charging circuit 230 includes transistors Tr1 and Tr2, and a plurality of resistors R11 to R14. When the second turn-on instruction signal S2 is in the on-level, the transistors Tr1 and Tr2 are turned on and the capacitor C1 is charged, and thus, a voltage $V_{C1}$ of the capacitor C1 rises to near the power source voltage.

The discharging path 232 includes resistors R15 and R16. While the second turn-on instruction signal S2 is in the off-level, the charge of the capacitor C1 is discharged via the discharging path 232, and the capacitor voltage $V_{C1}$ decreases. In the non-input state of the second turn-on instruction signal S2, the capacitor C1 is not charged, and the capacitor voltage $V_{C1}$ is maintained at 0V.

In the input state of the second turn-on instruction signal S2, since the capacitor C1 is charged in a period shorter than the time constant of the discharging of the capacitor C1, the capacitor voltage $V_{C1}$ is maintained at a high-level (near $V_{DD}$). The inverter 234 binaries the voltage $V_{C1}$ of the capacitor C1 to high and low, and inverts and outputs the voltage $V_{C1}$. In this configuration, assertion of the pulse detection signal S3\ ("\" refers to negative logic) is low, and negation of the pulse detection signal S3\ is high.

The configuration of the pulse detection circuit 224A is not limited to the configuration in FIG. 6. For example, by changing the charging and the discharging, when the second turn-on instruction signal S2 is in the on-level, the capacitor C1 may be instantaneously discharged, and when the second turn-on instruction signal S2 is in the off-level, the capacitor C1 may be charged with a predetermined time constant.

The logic circuit 226 includes transistors Tr4 and Tr5, and resistors R18 to R22. The logic circuit 226 generates a gate signal S4 of the switch SW2 based on the second turn-on instruction signal S2 and the pulse detection signal S3\.

When the pulse detection signal S3 is low (asserted) or the second turn-on instruction signal S2 in the on-level (high), the gate signal S4 becomes high, and the second switch SW2 is turned on. When the pulse detection signal S3 is high (negated), and the second turn-on instruction signal S2 in the off-level (high), the gate signal S4 becomes low, and the second switch SW2 is turned off.

Embodiment 21

Figure 7:
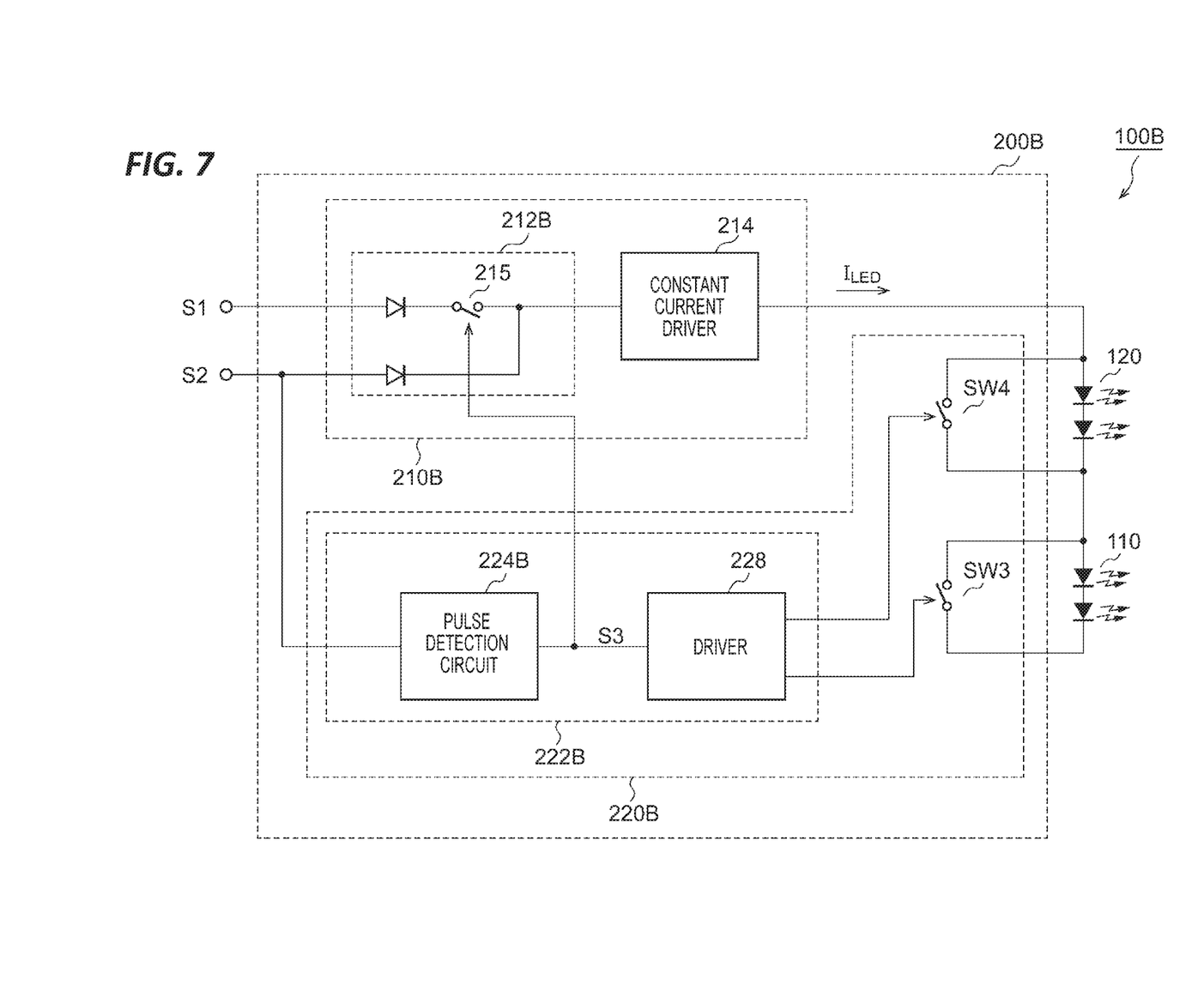
FIG. 7 is a circuit diagram of a vehicle lamp according to an embodiment 2.

FIG. 7 is a circuit diagram of a vehicle lamp 100B according to an embodiment 2. In the embodiment 2, the first light source 110 and the second light source 120 are connected in series. A turn-on circuit 200B includes a drive circuit 210B and a distribution circuit 220B.

The drive circuit 210B is enabled (□) when the first turn-on instruction signal S1 is in the on-level and the second turn-on instruction signal S2 is not input, and (□) when the second turn-on instruction signal S2 is in the on-level. The drive circuit 210B includes a diode OR circuit 212B and a constant current driver 214. The diode OR circuit 212B is obtained by adding a switch 215 to the diode OR circuit in FIG. 4. The switch 215 is turned off in the input state of the second turn-on instruction signal S2, and is turned on in the non-input state.

The distribution circuit 220B includes a third switch SW3, a fourth switch SW4, and a control circuit 222B. The third switch SW3 is connected to the first light source 110 in parallel, and the fourth switch SW4 is connected to the second light source 120 in parallel. The control circuit 222B turns off the third switch SW3 and turns on the fourth switch SW4 in the non-output state of the second turn-on instruction signal S2, and turns on the third switch SW3 and turns off the fourth switch SW4 in the input state of the second turn-on instruction signal S2.

The control circuit 222B includes a pulse detection circuit 224B and a driver 228. The pulse detection circuit 224B generates the pulse detection signal S3 that is asserted in the input state of the second turn-on instruction signal S2 and is negated in the non-input state. The driver 228 exclusively turns off the third switch SW3 and the fourth switch SW4 according to the pulse detection signal S3. The driver 228 may be omitted depending on the type of switch or the like.

Figure 8:
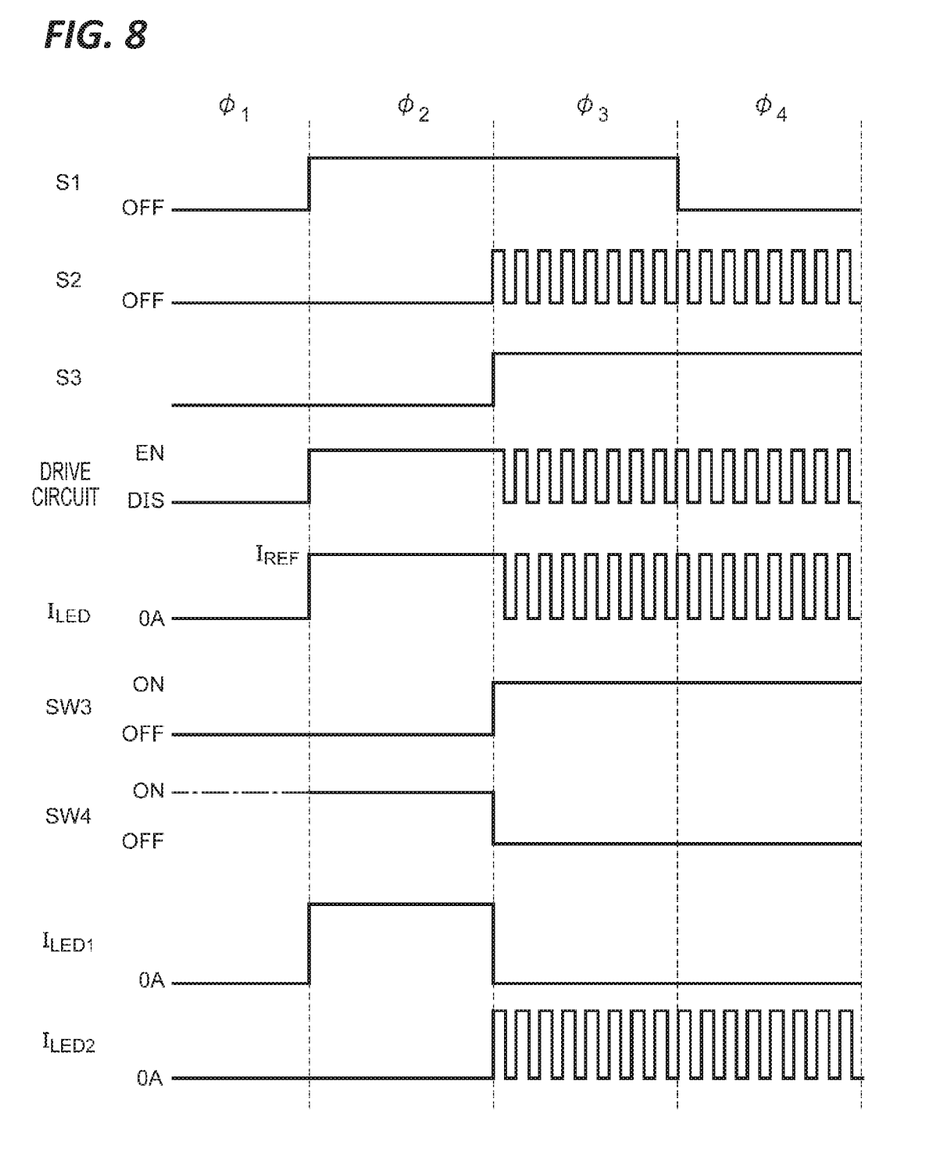
FIG. 8 is a view for explaining an operation of the vehicle lamp in FIG. 7.

FIG. 8 is a view for explaining an operation of the vehicle lamp 100B in FIG. 7.

In the non-input states φ1 and φ2 of the second turn-on instruction signal S2, the pulse detection signal S3 is negated (here, low), and in the input states φ3 and φ4 of the second turn-on instruction signal S2, the pulse detection signal S3 is asserted (here, high).

(□) A state where the first turn-on instruction signal S1 is in the off-level and the second turn-on instruction signal S2 is not input In the state φ1, the drive circuit 210B is in a disabled state, and the drive current $I_{LED}$ is not generated. Therefore, the drive currents $I_{LED1}$ and $I_{LED2}$ are not supplied neither of the first light source 110 and the second light source 120, and the first light source 110 and the second light source 120 are turned off.

(□) A state where the first turn-on instruction signal S1 is in the on-level and the second turn-on instruction signal S2 is not input In this state φ2, the drive circuit 210B is in the enabled state, and the drive current $I_{LED}$ that is stabilized at a target level $I_{REF}$ is generated. By turning off the third switch SW3 and turning on the fourth switch SW4, the drive current $I_{LED}$ flows through the path including the fourth switch SW4 and the first light source 110. Therefore, only the first light source 110 is turned on.

(□) A state where the first turn-on instruction signal S1 is in the on-level and the second turn-on instruction signal S2 is input In this state φ3, the drive circuit 210B is intermittently in the enabled state according to the second turn-on instruction signal S2, and the intermittent drive current $I_{LED}$ in which amplitude is stabilized at the target level $I_{REF}$ is generated. The third switch SW3 is turned on, and the fourth switch SW4 is turned off, and thus, the intermittent drive current $I_{LED2}$ is supplied to the second light source 120, and the second light source 120 blinks. The first light source 110 is turned off.

(□) A state where the first turn-on instruction signal S1 is in the off-level and the second turn-on instruction signal S2 is input In this state φ4, the drive circuit 210B is intermittently in the enabled state according to the second turn-on instruction signal S2, and the intermittent drive current $I_{LED}$ in which amplitude is stabilized at the target level $I_{REF}$ is generated.

The third switch SW3 is turned on, and the fourth switch SW4 is turned off, and thus, the intermittent drive current $I_{LED2}$ is supplied to the second light source 120, and the second light source 120 blinks.

The above is the operation of the vehicle lamp 100B. According to the vehicle lamp 100B, the same effect as the vehicle lamp 100A is obtained.

Figure 9:
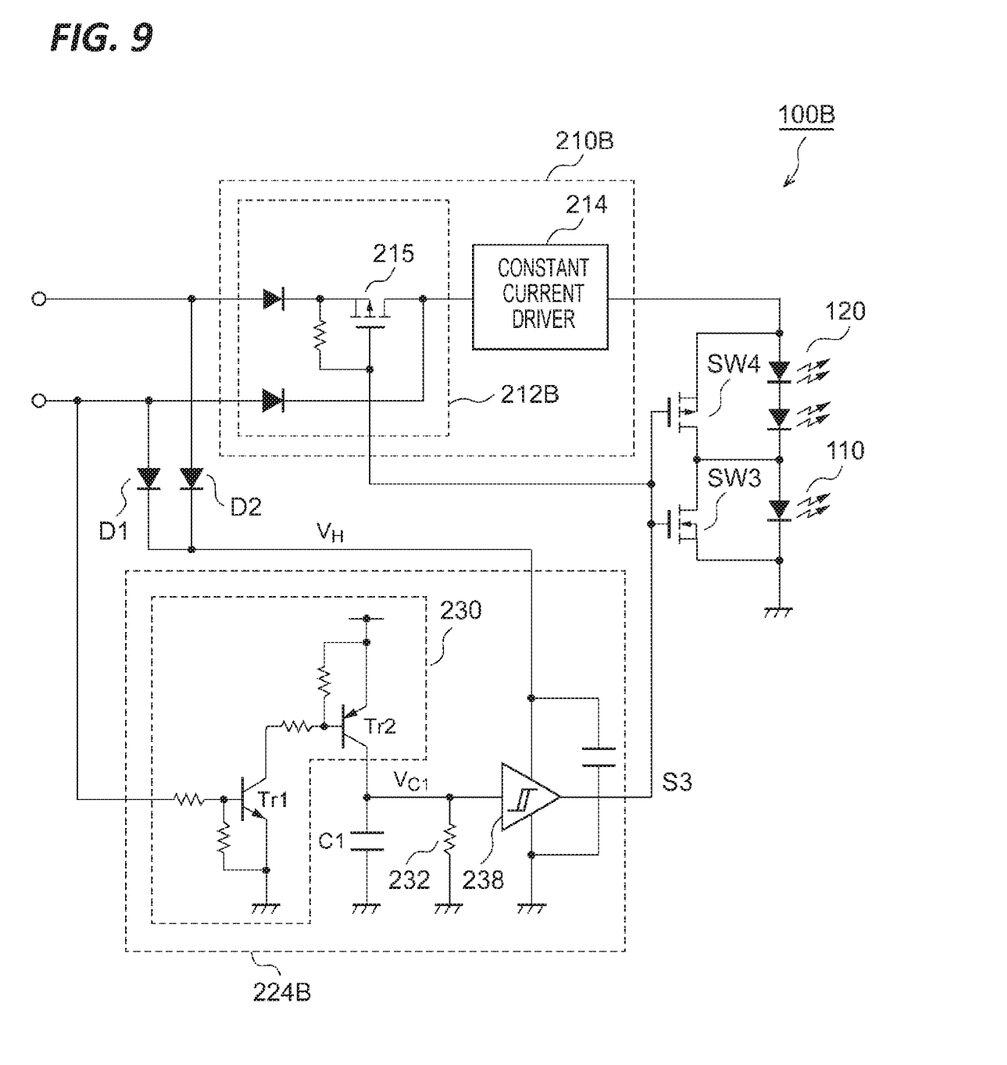
FIG. 9 is a circuit diagram illustrating a more specific exemplary configuration of the vehicle lamp in FIG. 7.

FIG. 9 is a circuit diagram illustrating a more specific exemplary configuration of the vehicle lamp 100B in FIG. 7. The pulse detection circuit 224B causes the pulse detection signal S3 to be asserted (high level) in the input state of the second turn-on instruction signal S2. The pulse detection signal S3 is supplied to a gate (control terminal) of the third switch SW3 and the fourth switch SW4. Since the third switch SW3 is an NMOS transistor and the fourth switch SW4 is a PMOS transistor, when the pulse detection signal S3 is asserted (high), the third switch SW3 is turned on and the fourth switch SW4 is turned off, and the drive current $I_{LED}$ flows to the second light source 120, and thus, it is possible to turn on the second light source 120. When the pulse detection signal S3 is negated (high), the third switch SW3 is turned off and the fourth switch SW4 is turned on, and the drive current $I_{LED}$ flows to the first light source 110, and thus, it is possible to turn on the first light source 110.

The switch 215 is a PMOS transistor, and is turned on when the pulse detection signal S3 is negated (low), and is turned off when the pulse detection signal S3 is asserted.

The pulse detection circuit 224B includes the charging circuit 230, the capacitor C1, the discharging path 232, and a buffer 238. The buffer 238 binaries the voltage $V_{C1}$ of the capacitor C1. A Schmitt buffer may be used for the buffer 238.

A high level voltage $V_H$ generated by diodes D1 and D2 is input to a power supply terminal of the buffer 238. Therefore, it is possible to reliably turn on/off the fourth switch SW4 and the third switch SW3.

The vehicle lamps 100 (100A and 100B) according to the embodiments may be understood as following.

The turn-on circuit 200

(□) immediately turns on the second light source 120 and immediately turns off the first light source 110 when the second turn-on instruction signal S2 transits to the on-level while the first turn-on instruction signal S1 is in the on-level, and (□) immediately turns off the second light source 120 and turns on the first light source 110 after a predetermined time when the second turn-on instruction signal S2 transits to the off-level while the first turn-on instruction signal S is in the on-level.

(Application)

Figure 10A:
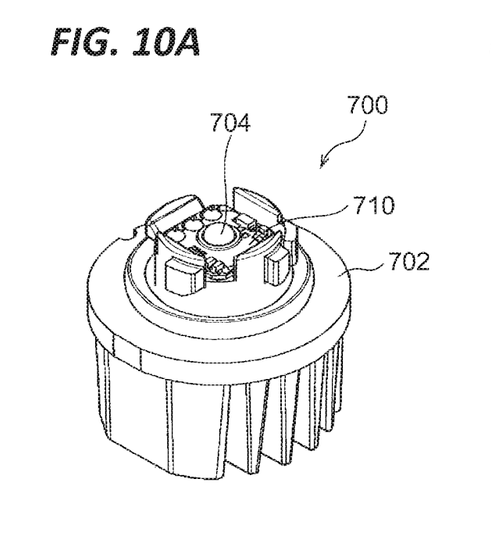
FIGS. 10A to 10D are views illustrating an LED socket that is an example of a vehicle lamp.
Figure 10B:
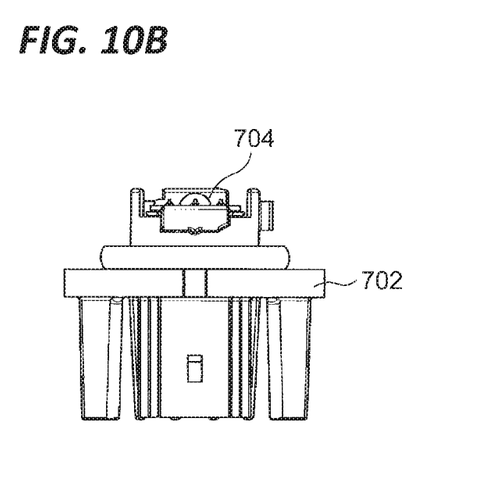
Figure 10C:
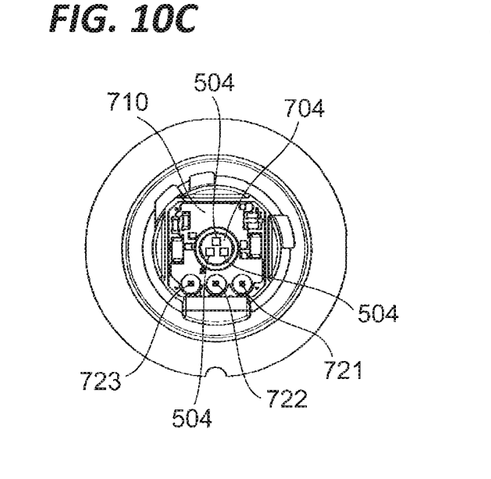
Figure 10D:
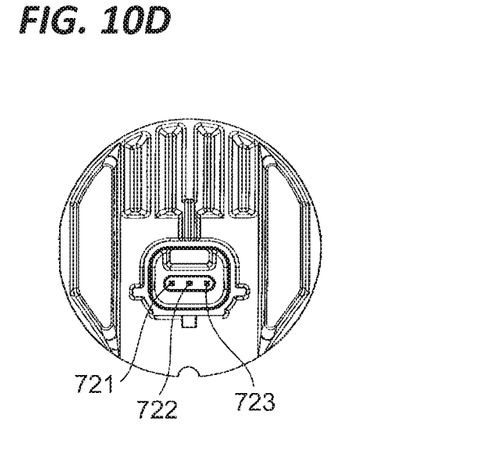

Subsequently, an application of the vehicle lamp 100 will be described. FIGS. 10A to 10D are views illustrating an LED socket 700 that is an example of the vehicle lamp 100. FIG. 10A is a perspective view of an exterior of the LED socket 700. FIG. 10B illustrates a front view of the LED socket 700, FIG. 10C illustrates a plan view of the LED socket 700, and FIG. 10D illustrates a bottom view of the LED socket 700.

A case body 702 has a shape that is attachable to and detachable from a lamp body (not illustrated). A plurality of light emitting elements 504 is mounted in a central portion, and is covered with a transparent cover 704. Parts of a turn-on circuit 600 are mounted on a substrate 710. Some of the plurality of light emitting elements 504 are LED chips that constitute the first light source 110, and others are LED chips that constitute the second light source 120.

Three fins 721, 722, and 723 are exposed on the bottom side of the case body 702. The first turn-on instruction signal S1 is supplied to the fin 721, and the ground voltage is supplied to the fin 722. The second turn-on instruction signal S2 is supplied to the fin 723. The fins 721 to 723 penetrate through the inside of the case body 702, and one ends thereof are connected to a wiring pattern of the substrate 710.

In the above, the present disclosure has been described based on the embodiments. The exemplary embodiments are merely examples, and a person ordinarily skilled in the related art may understand that various modifications may be made to a combination of respective components or respective processes and such modifications are also within the scope of the present disclosure. Hereinafter, such modifications will be described.

(Modification 1)

In the embodiment 1 in FIG. 4, the switch 215 in FIG. 7 may be added to the diode OR circuit 212. In this case, in the state φ3, the constant current driver 214 is intermittently in the enabled state according to the second turn-on instruction signal S2, and the intermittent drive current $I_{LED}$ is generated. In this case, when the pulse detection signal S3 is asserted, the second switch SW2 may be fixedly turned on.

(Modification 2)

In the embodiment 2 in FIG. 7, the switch 215 in the diode OR circuit 212B may be omitted. In this case, in the state φ3, the constant current driver 214 is continuously in the enabled state, and the continuous drive current $I_{LED}$ is generated. In this case, when the pulse detection signal S3 is asserted, the fourth switch SW4 may be intermittently switched according to the second turn-on instruction signal S2.

(Modification 3)

In the embodiment, the target amount $I_{REF}$ of the drive current $I_{LED}$ is the same in the three states φ2 to φ4. However, the present disclosure is not limited thereto, and the target amount $I_{REF}$ of the drive current $I_{LED}$ may be different when the first light source 110 is turned on (φ2) and when the second light source 120 is turned on (φ3 and φ4). In this case, the target amount $I_{REF}$ may be switched based on the pulse detection signal S3 or signals related thereto.

(Modification 4)

In the embodiment, a clearance lamp and a turn lamp have been described as a combination of a first light source and a second light source, but the present disclosure is not limited thereto. The combination of the first light source and the second light source may be a tail lamp and a turn lamp, or a stop lamp and a turn lamp. In this case, the first light source may be substituted from the white semiconductor light source to a red semiconductor light source.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
   a first light source;
   a second light source;
   a first input terminal that receives a first turn-on instruction signal instructing turn-on/off of the first light source;
   a second input terminal that receives a pulsed second turn-on instruction signal instructing turn-on/off of the second light source; and
   a turn-on circuit that drives the first light source and the second light source based on the first turn-on instruction signal and the second turn-on instruction signal,
   wherein the turn-on circuit includes:
   a drive circuit that becomes enabled based on the first turn-on instruction signal and the second turn-on instruction signal, and outputs a constant drive current from an output terminal; and
   a distribution circuit that forms a current path such that the drive current flows to the second light source in an input state of the second turn-on instruction signal, and forms a current path such that the drive current flows to the first light source in a non-input state of the second turn-on instruction signal,
   wherein one end of the first light source and one end of the second light source are connected to an output of the drive circuit,
   the drive circuit becomes enabled when at least one of the first turn-on instruction signal and the second turn-on instruction signal is in an on-level, and
   the distribution circuit includes:
   a first switch connected to the other end of the first light source;
   a second switch connected to the other end of the second light source; and
   a control circuit that turns on the first switch and turns off the second switch in the non-input state of the second turn-on instruction signal, and turns off the first switch and switches the second switch according to the second turn-on instruction signal in the input state of the second turn-on instruction signal.

2. The vehicle lamp according to claim 1, wherein the control circuit includes a pulse detection circuit that generates a pulse detection signal that is asserted in the input state of the second turn-on instruction signal and negated in the non-input state of the second turn-on instruction signal, and the control circuit controls the first switch according to the pulse detection signal, and the second switch according to the pulse detection signal and the second turn-on instruction signal.

3. The vehicle lamp according to claim 2, wherein the vehicle lamp is an LED socket.

4. The vehicle lamp according to claim 1, wherein the vehicle lamp is an LED socket.

5. A vehicle lamp comprising:
   a first light source;
   a second light source;
   a first input terminal that receives a first turn-on instruction signal instructing turn-on/off of the first light source;
   a second input terminal that receives a pulsed second turn-on instruction signal instructing turn-on/off of the second light source; and
   a turn-on circuit that drives the first light source and the second light source based on the first turn-on instruction signal and the second turn-on instruction signal,
   wherein the turn-on circuit includes:
   a drive circuit that becomes enabled based on the first turn-on instruction signal and the second turn-on instruction signal, and outputs a constant drive current from an output terminal; and
   a distribution circuit that forms a current path such that the drive current flows to the second light source in an input state of the second turn-on instruction signal, and forms a current path such that the drive current flows to the first light source in a non-input state of the second turn-on instruction signal, wherein the first light source and the second light source are connected in series, the drive circuit becomes enabled (i) when the first turn-on instruction signal is in an on-level and the second turn-on instruction signal is not input, and (ii) when the second turn-on instruction signal is in the on-level, and the distribution circuit includes:

a third switch connected to the first light source in parallel, a fourth switch connected to the second light source in parallel, and a control circuit that turns off the third switch and turns on the fourth switch in the non-input state of the second turn-on instruction signal, and turns on the third switch and turns off the fourth switch in the input state of the second turn-on instruction signal.

6. The vehicle lamp according to claim 5, wherein the control circuit includes a pulse detection circuit that generates a pulse detection signal that is asserted in the input state of the second turn-on instruction signal and negated in the non-input state of the second turn-on instruction signal, and exclusively turns on the third switch and the fourth switch according to the pulse detection signal.

7. The vehicle lamp according to claim 6, wherein the vehicle lamp is an LED socket.

8. The vehicle lamp according to claim 5, wherein the vehicle lamp is an LED socket.

9. A vehicle lamp comprising:

a first light source;

a second light source;

a first input terminal that receives a first turn-on instruction signal instructing turn-on/off of the first light source;

a second input terminal that receives a pulsed second turn-on instruction signal instructing turn-on/off of the second light source; and a turn-on circuit that drives the first light source and the second light source based on the first turn-on instruction signal and the second turn-on instruction signal, wherein the turn-on circuit includes:

a drive circuit that becomes enabled based on the first turn-on instruction signal and the second turn-on instruction signal, and outputs a constant drive current from an output terminal; and a distribution circuit that forms a current path such that the drive current flows to the second light source in an input state of the second turn-on instruction signal, and forms a current path such that the drive current flows to the first light source in a non-input state of the second turn-on instruction signal, wherein the turn-on circuit is configured to:

(i) immediately turn on the second light source and immediately turn off the first light source when the second turn-on instruction signal transits to an on-level while the first turn-on instruction signal is in the on-level, and (ii) immediately turn off the second light source and turn on the first light source after a predetermined time when the second turn-on instruction signal transits to an off-level while the first turn-on instruction signal is in the on-level, wherein one end of the first light source and one end of the second light source are connected to an output of the drive circuit, the drive circuit becomes enabled when at least one of the first turn-on instruction signal and the second turn-on instruction signal is in an on-level, and the distribution circuit includes:

a first switch connected to the other end of the first light source, a second switch connected to the other end of the second light source; and a control circuit that turns on the first switch and turns off the second switch in the non-input state of the second turn-on instruction signal, and turns off the first switch and switches the second switch according to the second turn-on instruction signal in the input state of the second turn-on instruction signal.

10. The vehicle lamp according to claim 9, wherein the vehicle lamp is an LED socket.

* * * * *